US008280802B1

(12) United States Patent
Cervo

(10) Patent No.: US 8,280,802 B1
(45) Date of Patent: Oct. 2, 2012

(54) SYSTEM AND METHOD FOR DECISIONS IN TRADING FINANCIAL INSTRUMENTS

(76) Inventor: Frank J. Cervo, Fairmont, WV (US)

(*) Notice: Subject to any disclaimer, the term of this patent is extended or adjusted under 35 U.S.C. 154(b) by 0 days.

(21) Appl. No.: 13/224,810

(22) Filed: Sep. 2, 2011

(51) Int. Cl.
*G06Q 40/00* (2006.01)
(52) U.S. Cl. .......................... 705/37; 705/38
(58) Field of Classification Search .............. 705/35–40
See application file for complete search history.

(56) References Cited

U.S. PATENT DOCUMENTS

| 5,339,392 | A | * | 8/1994 | Risberg et al. ............... 715/762 |
| 7,783,544 | B2 | * | 8/2010 | Horowitz ........................ 705/35 |
| 7,848,995 | B2 | | 12/2010 | Dalal | |
| 2006/0287945 | A1 | | 12/2006 | Spaccatrosi | |
| 2008/0192069 | A1 | | 8/2008 | Wanzke | |
| 2008/0313560 | A1 | | 12/2008 | Dalal | |

FOREIGN PATENT DOCUMENTS

| WO | 01/95176 A2 | 12/2001 |
| WO | 03/065258 A2 | 8/2003 |
| WO | 2009/021242 A2 | 2/2009 |

* cited by examiner

*Primary Examiner* — Thu Thao Havan
(74) *Attorney, Agent, or Firm* — Summa, Additon & Ashe, P.A.

(57) ABSTRACT

A computerized system alerts a change in direction of the price of a tradable financial instrument. The system plots a resistance line, a support line, and a transition point at which the price is changing. The transition point occurs when the price of the tradable instrument is either higher or lower than both the corresponding resistance point on the resistance line and a corresponding support point on the support line. Resistance points are calculated sequentially as the lowest averaged values of a series of critical prices for a particular time period. Support points are calculated sequentially as the highest averaged values of a series of critical prices for a particular time period, wherein the critical prices comprise the highest price, the lowest price, and the closing price of the tradable instrument for that particular time period.

33 Claims, 12 Drawing Sheets

SYSTEM AND METHOD FOR DECISIONS IN TRADING FINANCIAL INSTRUMENTS

FIELD OF THE INVENTION

The invention relates to a system and method of utilizing a computer to (i) track and predict the price performance of a tradable instrument, such as a stock, bond, commodity, mutual fund, and the like, and (ii) assisting the user in making decisions regarding the buying and selling of that instrument.

BACKGROUND

Analysts, traders, and even individual investors consistently look for ways to maximize their profits. These individuals have a keen interest in determining whether a tradable financial instrument will go up or down in price and whether they should change their respective ownership positions accordingly. Unfortunately, systems of the prior art rely heavily upon past price performance for the tradable instrument, which may include any item of value that can be subject to exchange in any market (e.g., stocks, bonds, mutual funds, commodities, commercial paper, currencies, options on these kinds of instruments, and the like). With the advancement of international markets and exchanges, the need for more precise systems for trading securities and other instruments has become a world-wide endeavor. A system with the ability to predict the performance of a traded instrument would have around the clock applicability.

Traders have utilized various systems to analyze the price performance of tradable instruments. Some of the simpler systems track the historical performance and use averages over time to predict performance. Other systems plot the cycles of price performance with the hope that the cycles repeat themselves over time. Expert analysts create wildly complicated formulas for incorporating numerous variables into the equation, such as current economic conditions in specific regions, technological advancements in particular market sectors, and even the weather reports for commodities exchanges. All of these systems have a degree of unpredictability because markets change too fast for historical performance and objective scientific facts to keep up with an emotion-driven marketplace that changes with instantaneous news traveling all over the world.

U.S. Pat. No. 7,848,995 (Dalal 2010) shows one prior system that has attempted to consolidate both historical and prospective approaches to price changes in a trading market. Dalal uses a graphical representation of the buying pressure and the selling pressure for a respective tradable instrument over numerous time periods to determine trends in price changes. Dalal uses real time plots of the buying and selling pressure in the marketplace as graphical lines for visual cues of demand. The buying and selling pressure lines represent historical collective desire to buy or sell an instrument. Dalal tracks trends by analyzing the open, close, high, and low market prices for a variety of time periods and determines where the buying pressure line crosses the selling pressure line, or vice versa, to establish a change in the buying or selling trend. Dalal looks for changes in the trends over several different time periods to establish an alignment that indicates a true trend reversal in buying and selling pressure. The pressure lines that Dalal plots are created by "algorithms using mathematical formulas based on open, high, low, close prices of the Market Vehicle for a particular time frame either independently, or in a combination with some variable factors and constants." Col. 18, Lines 18-21. Dalal gives an example that the pressure lines may be based upon a tradable instrument's average open and close price for a variety of time frames. Dalal uses a natural log function as an exponential to normalize the data for plotting different time periods in the same graph. Data other than close prices may be used for charting (i.e., bid and ask prices noted in col. 18, lines 29-30). Dalal's theory of plotting buying and selling pressure relies extensively upon the concept that as selling pressure V1 begins peaking, the market will soon begin heading in a bullish (buying) direction, and when the buying pressure is on the rise, the market will soon be heading in a bearish direction because the buying trend will eventually weaken. Dalal marks the cross points of the trend waves as indicators of a new direction for that instrument. The trends are based upon collective historical data of open, close, high, and low points for the price of the trade. In other words, Dalal's data is embedded with historical data, and the trends are represented as waves of data over periods of time.

Dalal's FIGS. 5 and 6 show the trend analysis at a crossing point of buying pressure and selling pressure waves. Dalal notes that when the closing price of a tradable instrument begins moving downward and the selling pressure wave is moving upward toward a higher buying pressure wave, then the transition from bullish to bearish is approaching. When the closing price of a tradable instrument begins moving downward and the buying pressure begins moving downward toward a lower selling pressure, then again the trend is changing from bullish to bearish for that instrument. When the closing price begins moving upward in circumstances when either the buying pressure increases toward a higher selling pressure wave or the selling pressure wave decreases toward a lower buying pressure wave, then that instrument is moving from bearish to bullish.

Dalal's algorithm relies entirely upon trends over time to determine how to plot the buying and selling pressure waves and to normalize them with the natural logarithm exponential (another indication of how time periods are embedded within Dalal's algorithm). To enhance the original algorithm and its associated trend waves, Dalal further plots the highest closing price and the lowest closing price as individual "dots" superimposed over the wave paths representing buying and selling pressure. The positions of the highest and lowest closing prices are further indicators of trends. Generally, the position of the highest closing prices dots will be below the buying pressure wave plot when stronger selling pressure exists and will be above the buying pressure wave plot when stronger buying pressure exists in a market. The position of the lowest closing price dots will be above the selling pressure line when stronger selling pressure exists and will be below the buying pressure line stronger buying pressure exists in a market.

Dalal notes that the system described in the '995 patent that one technical indicator is available by calculating pivot points defined as a particular stock's high, low, and closing prices. If the following day's market price falls below the pivot point (i.e., below the average), that pivot point may indicate a trend reversal downward and a new resistance level. "Conversely, if the market price rises above the pivot point, it may act as the new support level." See Dalal, Col. 12, Lines 6-12.

Dalal continued this line of research in a follow-up continuation in part application published as United States Patent Publication No. 20080313560 (Dec. 18, 2008). Notably, Dalal, incorporated the pivot point concept as a way of calculating traditional support and resistance lines that are known in the art today. Support lines indicate support for an upward price trend, and resistance lines indicate resistance to continued upward movement in price. Dalal uses the pivot points, defined as the average of the high, low, and close values for a traded instrument, to calculate resistance and support points for the respective line plots. Dalal's formulas for calculating the resistance and support points are detailed in Dalal's '560 publication at paragraphs [0358] and [0359]. Notably, the resistance and support lines utilize the previously calculated pivot points with particular weighting (i.e., the resistance point is waiting toward the highest price of the instrument, and the support points are weighted toward the lowest price paid for the instrument). Dalal notes in particular that pivot calculations shift with time, as Dalal uses a "new point in-last point out system" so that the data shifts with time. Dalal further describes the use of a moving average of pivot points to smooth out the data. This is in line with Dalal's overall interest in a collective history in each data point.

Even with Dalal's research and other similar attempts at predicting trading points in a market, a need exists for a system that more accurately provides up to date information regarding the price of a traded instrument.

BRIEF SUMMARY OF THE INVENTION

A computerized system alerts a change in direction of the price of a tradable financial instrument at a critical point in time prior to the actual time at which the change occurs by plotting on a computer a resistance line for the price of the tradable financial instrument, a support line for the price of a tradable instrument, and a transition point at which the price of the tradable instrument is predicted as being in either an upward trend or a downward trend. The transition point is calculated as a price point at which the price of the tradable instrument is either higher or lower than both the corresponding resistance point on the resistance line and a corresponding support point on the support line. Resistance points on the resistance line are calculated sequentially as the lowest averaged values of a series of critical prices for a particular time period, and support points on the support line are calculated sequentially as the highest averaged values of a series of critical prices for a particular time period, wherein the critical prices comprise the highest price, the lowest price, and the closing price of the tradable instrument for that particular time period.

DETAILED DESCRIPTION

Figure 1:
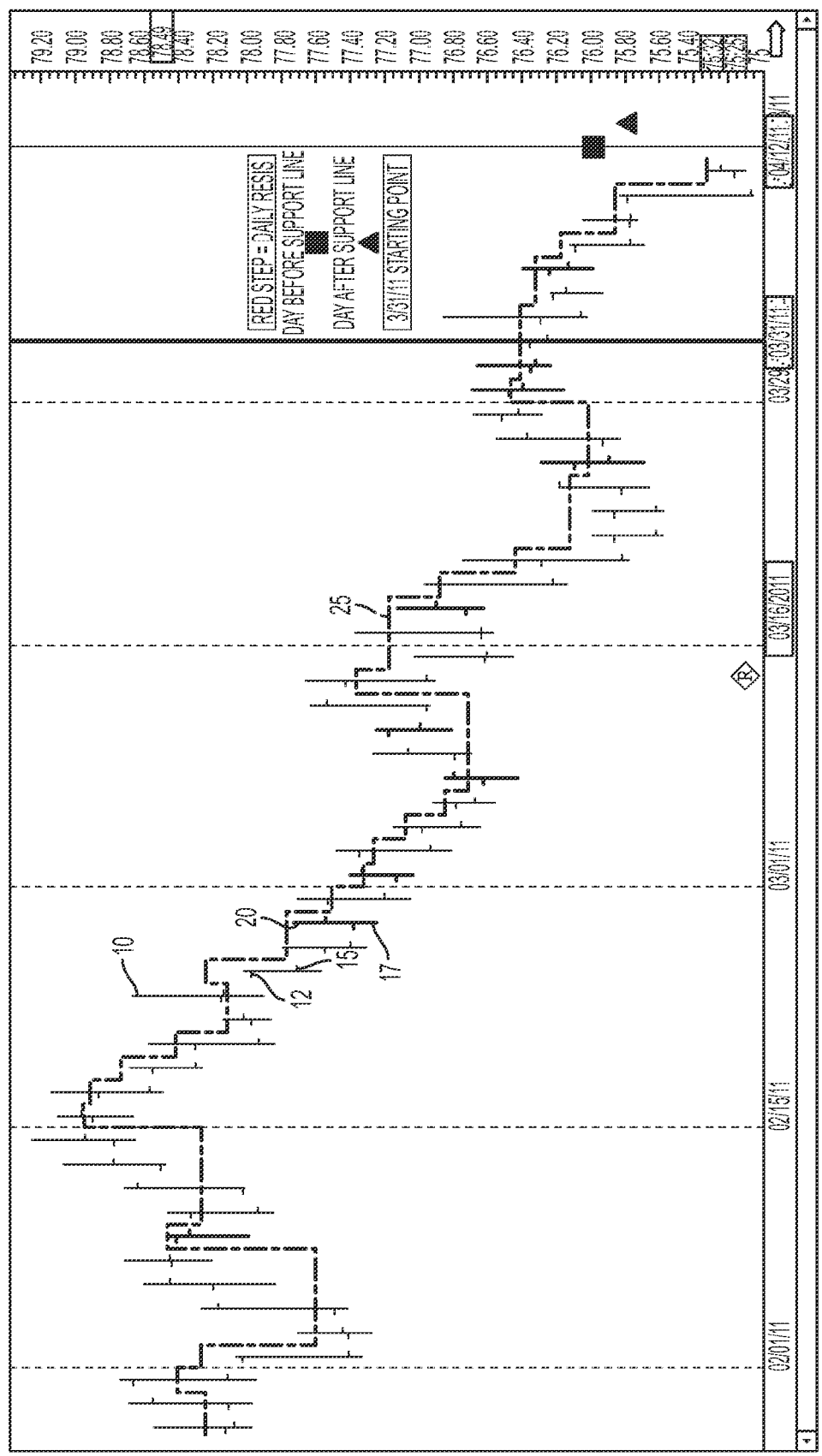
FIG. 1 is a computerized graphical plot of a series of vertical price bars and a fluctuating resistance line showing the range of prices for a particular time period for a tradable financial instrument.

The system of this invention includes both a method of calculating upward and downward trends in the trading price of marketable financial instruments but also visual presentations of price data that alert the user to the status of trading the instrument. The system is described below with reference to the following terms. These terms are identified with general definitions for context only and without limiting the invention in any way.

Tradable financial instrument—any security, commodity, commercial paper, currency, stock, bond, mutual fund, contract or any other thing of value that is traded among buyers and sellers in an orderly way.

Critical point—the earliest point at which a change in direction of the price of a tradable financial instrument can be detected.

Critical prices—the highest price, the lowest price, and the closing price of the tradable instrument for a particular time period.

Resistance points—points on a chart plotted for price versus time for a tradable financial instrument, wherein the resistance point price is the most recently achieved lowest averaged value of a series of critical prices for a particular time period.

Resistance line—a series of resistance points plotted for a tradable financial instrument; the resistance line progresses only when a new value has been calculated as the lowest averaged value of a series of critical prices for a particular time period.

Support point—points on a chart plotted for price versus time for a tradable financial instrument, wherein the support point price is the most recently achieved highest averaged value of a series of critical prices for a particular time period.

Support line—a series of support points plotted for a tradable financial instrument; the support line progresses only when a new value has been calculated as the highest averaged value of a series of critical prices for a particular time period.

Transition point—a point in time on a chart of price versus time for a tradable financial instrument at which the price of the tradable financial instrument crosses the resistance line and the support line in either direction on the chart.

Trade point—a point in time on a chart of price versus time for a tradable financial instrument at which the price of the tradable financial instrument is identified as being in either an upward trend or a downward trend.

Market entry alert—a trade point at which the price of the tradable financial instrument is higher than both a resistance line and a support line corresponding to the same time period as the price.

Market exit alert—a trade point at which the price of the tradable financial instrument is in a position to change the ownership position of a tradable financial instrument because the price is in either a downward trend or an upward trend.

Color zone—a graphical indicator on a chart of price versus time for a tradable financial instrument in which the background color for a period of time on the x-axis of the chart indicates whether the current price of the tradable financial instrument is (i) lower than the most recent lowest average of critical prices (high, low, close price for a time period); (ii) higher than the most recent highest average of critical prices (high, low, close price for a time period); and (iii) between the most recent lowest average of critical prices and the most recent highest average of critical prices.

Short position—a situation for a trader in which the trader expects to benefit from the price of a tradable financial instrument decreasing (e.g., borrowing shares of a security to deliver to a buyer upon the expectation that the price of the security will drop so the transaction can be closed later by purchasing actual shares at a lower price).

Long position—a situation for a trader in which the trader expects to benefit from the price of a tradable financial instrument increasing (e.g., purchasing shares of a security for later sale upon the expectation that the price of the security will increase).

Short position exit point—a price of a tradable instrument that is predicted as being in an upward trend, wherein the short position exit point is calculated as a price of the tradable instrument that is higher than a corresponding support point on said support line.

Long position exit point—a price of a tradable instrument that is predicted as being in a downward trend, wherein the long position exit point is calculated as a price of the tradable instrument that is lower than a corresponding resistance point on said support line.

The invention is best expressed by reference to the attached figures. The figures are by no means limiting of the invention but illustrate examples of the method and system implemented herein.

The discussion begins with reference to FIG. 1 which shows a series of price bars (10) indicating the range of prices for a tradable financial instrument for a particular time period. The price bars (10) are shown as vertical line segments on a chart and extend across the chart in a series for every time period that the instrument was traded. For example, when the chart is a daily chart, each price bar (10) shows the range of trading prices for a tradable financial instrument for a series of days. Each price bar (10) has a lowest price point (17) and a highest price point (20) for that trading period (e.g., for that day). Each price bar (10) also includes tabs (12, 15) that show the opening price (12) and the closing price (15) associated with that price bar (10). A price bar (10) may be associated with any time period (a series of price ticks, a series of minutes, an hour, a day, a week, a month, a quarter, and the like). Each price bar (10) is plotted for the selected time period with time units on the x-axis of the chart and price units on the y-axis of the chart. The price bars set the stage for the overall analysis of the system described herein.

As a background in the trading sector, price for tradable financial instruments do not travel in a straight up or straight down direction. Instead, the trends change across time periods. When the market is trading in an up-trend, it will re-trace some of its gain to what is called a "support line." An instrument with a price that is moving upward will hover around the support line for the price of a tradable financial instrument but will not drop below that support. The support line includes support points calculated sequentially as the highest values at which the instrument is trading as compared to earlier values. A support line, therefore, occurs when the price stops making lower highs, lower lows, and lower closing prices (i.e., the price trend is going up). When the price does make a lower high, a lower low, and a lower close than the prior period under consideration, then the market is trading below a resistance line. An instrument with a price that is moving downward will hover around the resistance line but not break through it to a higher high. The resistance line, therefore, includes resistance points calculated sequentially as the lowest averaged values at which the instrument is trading as compared to earlier values. Watching the price of the tradable financial instrument in comparison to the support and resistance lines allows a trader to predict trends as described below.

In the system described herein, support and resistance lines are established by determining when the price of a tradable financial instrument has achieved either a higher average or a lower average of critical prices. If the average of critical prices achieves a new low, then that low is a resistance point on the resistance line, and the price is in a down trend. If the average of critical prices has achieved a new high, then that newly established highest average of critical prices becomes a support point. Critical prices may be selected from any combination of the opening price, the closing price, the highest price, and the lowest price for a tradable financial instrument for a particular time period. In one embodiment, the opening price is excluded as a critical price because opening price is reflective of interest in the tradable financial instrument at the beginning of the day (i.e., open interest), when the general public (individuals, day traders, and the like) are most likely to be in the market. As the time period under consideration moves forward, the general public is less influential on price as they take smaller profits or cut losses and get out of the trading scenario. The most influential participants in the market (e.g. institutional investors) are in the market for longer periods and usually show greater influence at the end of a trading period. This influence is most readily shown in the closing price for a time period instead of the opening price for a time period. By excluding the opening price, therefore, the algorithm disclosed herein eliminates short term price fluctuations caused by activity from the general public and focuses more heavily on institutional investors whose activity truly moves the market.

In one embodiment, therefore, the critical prices for considering trends in prices changes for a tradable financial instrument are the highest price (20), the lowest price (17), and the closing price (15) for the instrument for the time period under consideration. Resistance points are plotted as sequentially lowest averaged values of these critical prices. Support points are plotted as sequentially highest averaged values of these critical prices. Support and resistance lines connect the respective support and resistance points on a plot for that tradable financial instrument.

In the system described herein, a computer graphically plots the support and resistance lines as the appropriate support and resistance points are calculated. As noted above, price trends are erratic and nonlinear, so either the support line or the resistance line may go for extensive periods of time without a new low or a new high for plotting. In other words, either the support line or the resistance line may be stalled in a given chart if one or the other of the lines dominates for a series of price bars. The figures included herein, therefore, show endpoints for support and resistance lines that are "waiting" until the price of the tradable financial instrument reaches a significant new average of critical prices, either a high for support points or a low for resistance points.

In the system of FIG. 1, the price bars are plotted along with a resistance line (25) for the tradable financial instrument. The resistance line of FIG. 1 is shown as a line extending across the chart with intermittent dots to distinguish the resistance line (25) from other lines discussed herein. The two main lines that are necessary to use this indicator are generally called support lines (30) and resistance lines (25) as discussed above. Each time period of interest may have its own pair of support and resistance lines. In other words there may be a daily resistance line (25), a daily support line (30), a weekly resistance line (41), a weekly support line (42), a monthly resistance line (50), a monthly support line (51), a quarterly resistance line (60), and a quarterly support line (61) for any tradable financial instrument. These lines are plotted on charts as shown in the figures associated with this disclosure.

Figure 2:
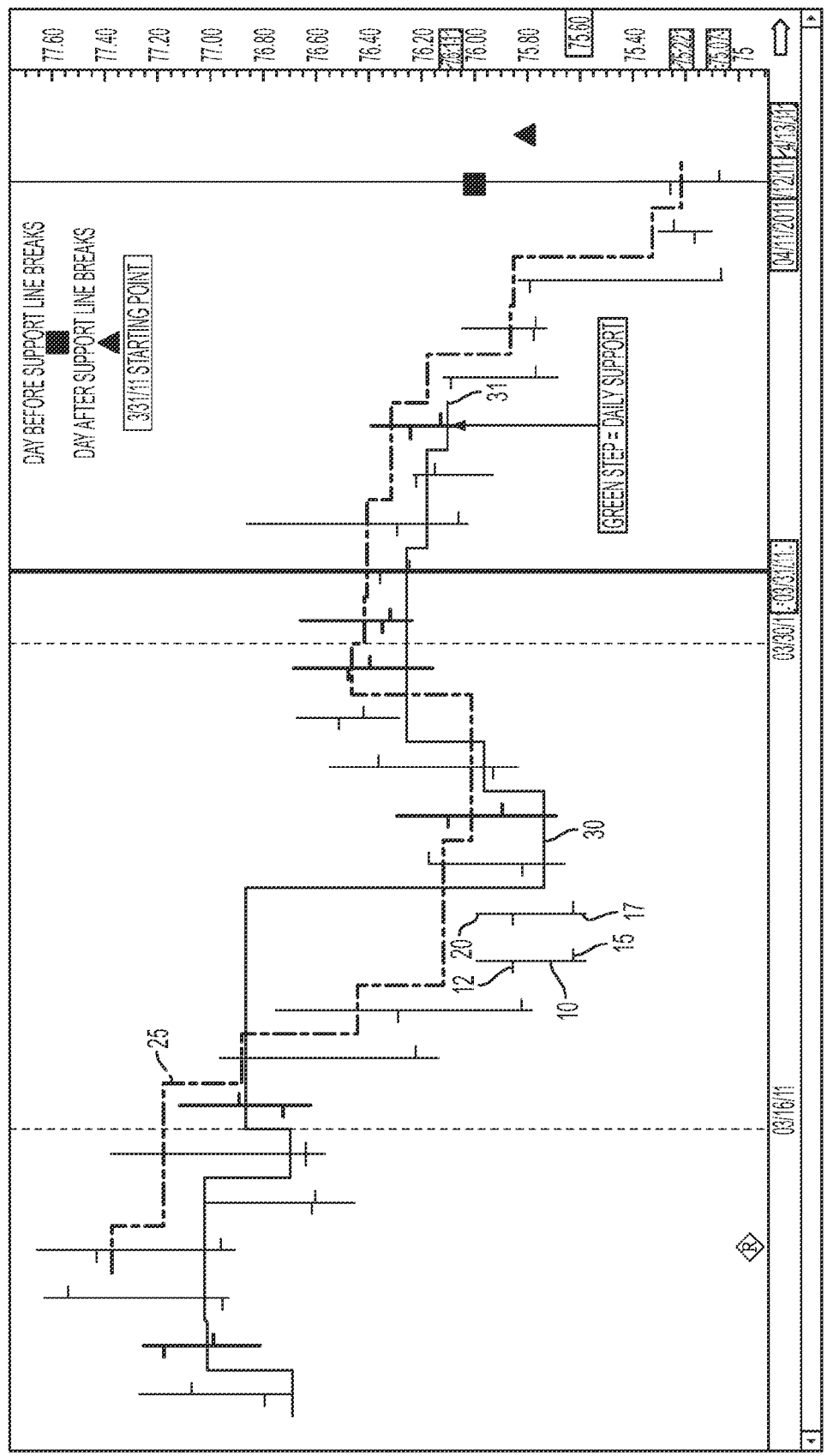
FIG. 2 is a computerized graphical plot of a series of price bars with a daily support line and a daily resistance line superimposed over the price bars.

FIG. 2 adds more information to the chart of FIG. 1 by superimposing a daily support line (30) onto the chart alongside the daily resistance line (25) that was shown in FIG. 1. Each price bar (10), therefore, correlates to a trading day having an opening price (12), a closing price (15), a lowest price (17), and a highest price (20). Each of those closing, lowest, and highest prices are considered critical prices for averaging to determine if the averaged value of critical prices has reached a new high (to reflect support for an up trend) or a new low (to reflect resistance and a down trend). As shown by the end point (31) on the daily support line (30), during a down trend, resistance dominates, so the support line (30) stalls, or "waits," at support line end point (31) as the resistance line (25)(dotted in the figure) continues to extend across the chart. If the chart of FIG. 2 continues indefinitely, then eventually the resistance line would stall as a new higher average of critical prices than that calculated for the most recent resistance point is calculated. At that new, higher average of critical prices, the resistance line (25) would stall, and the support line would connect to its new higher value.

Figure 3:
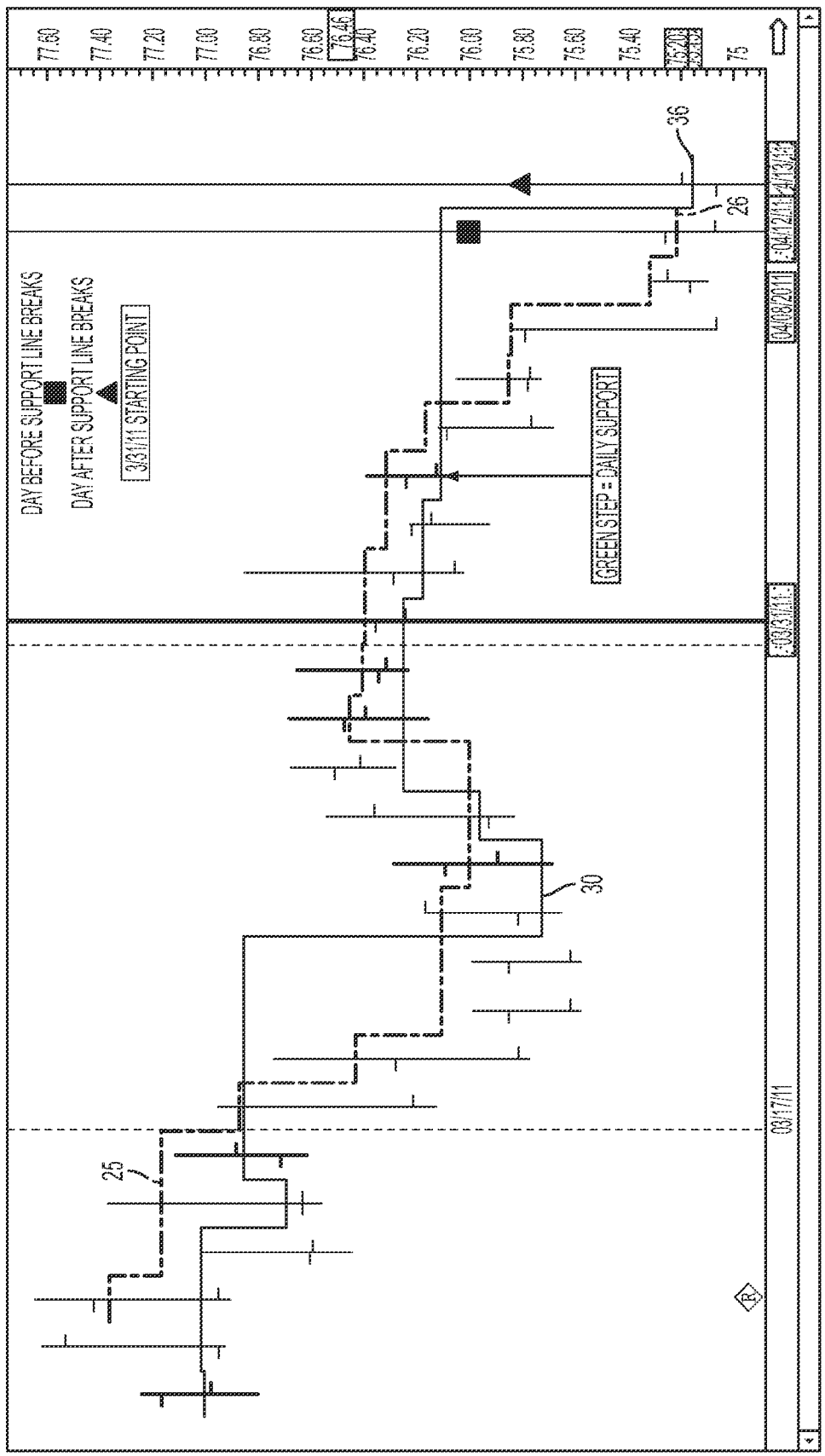
FIG. 3 is a computerized graphical plot of daily price bars with a stalled resistance line and continuing support line.
Figure 4:
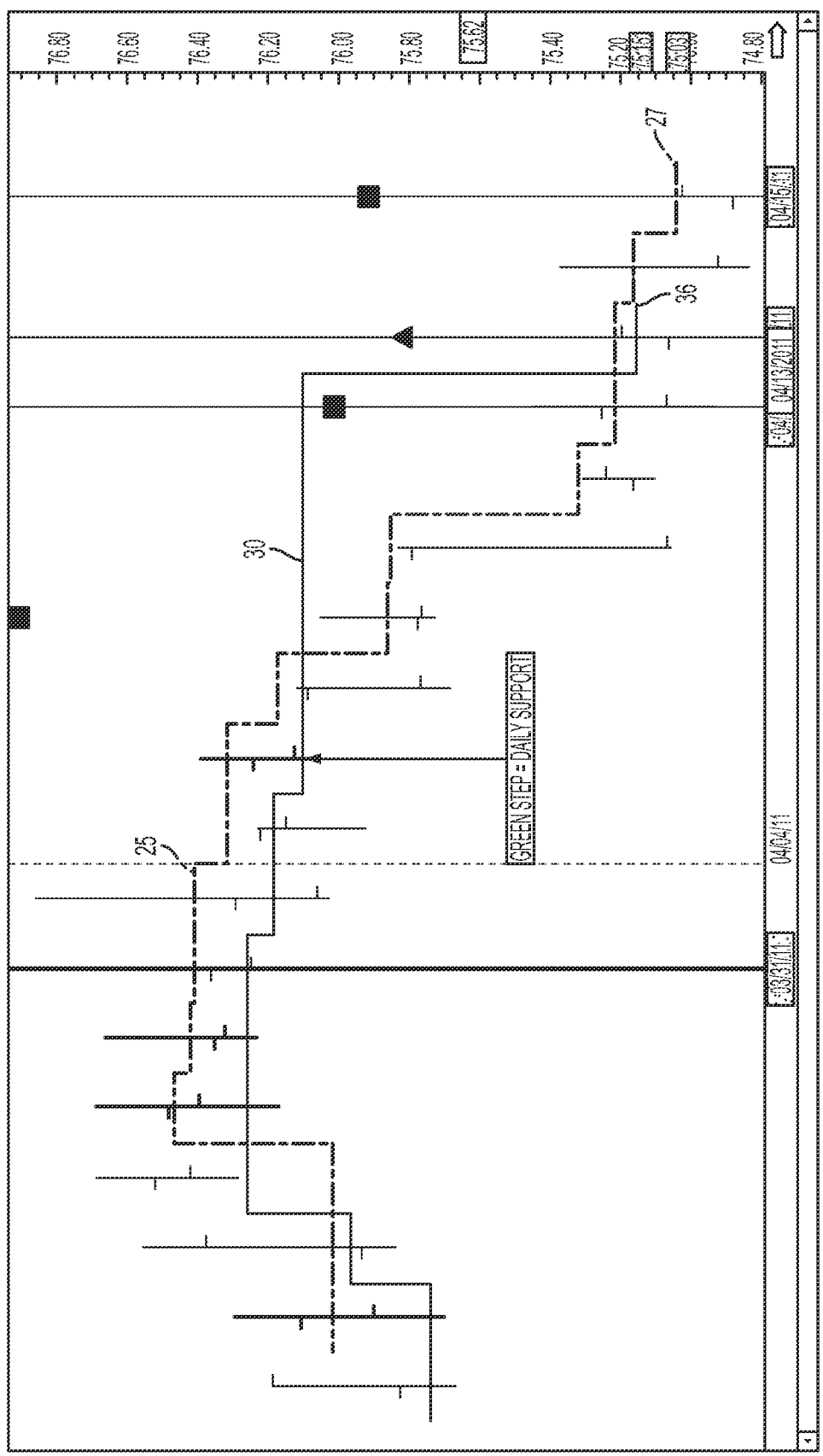
FIG. 4 is a computerized graphical plot of the price bars for a tradable financial instrument having a critical price average that has reached a new low such that the resistance line dominates the chart.
Figure 5:
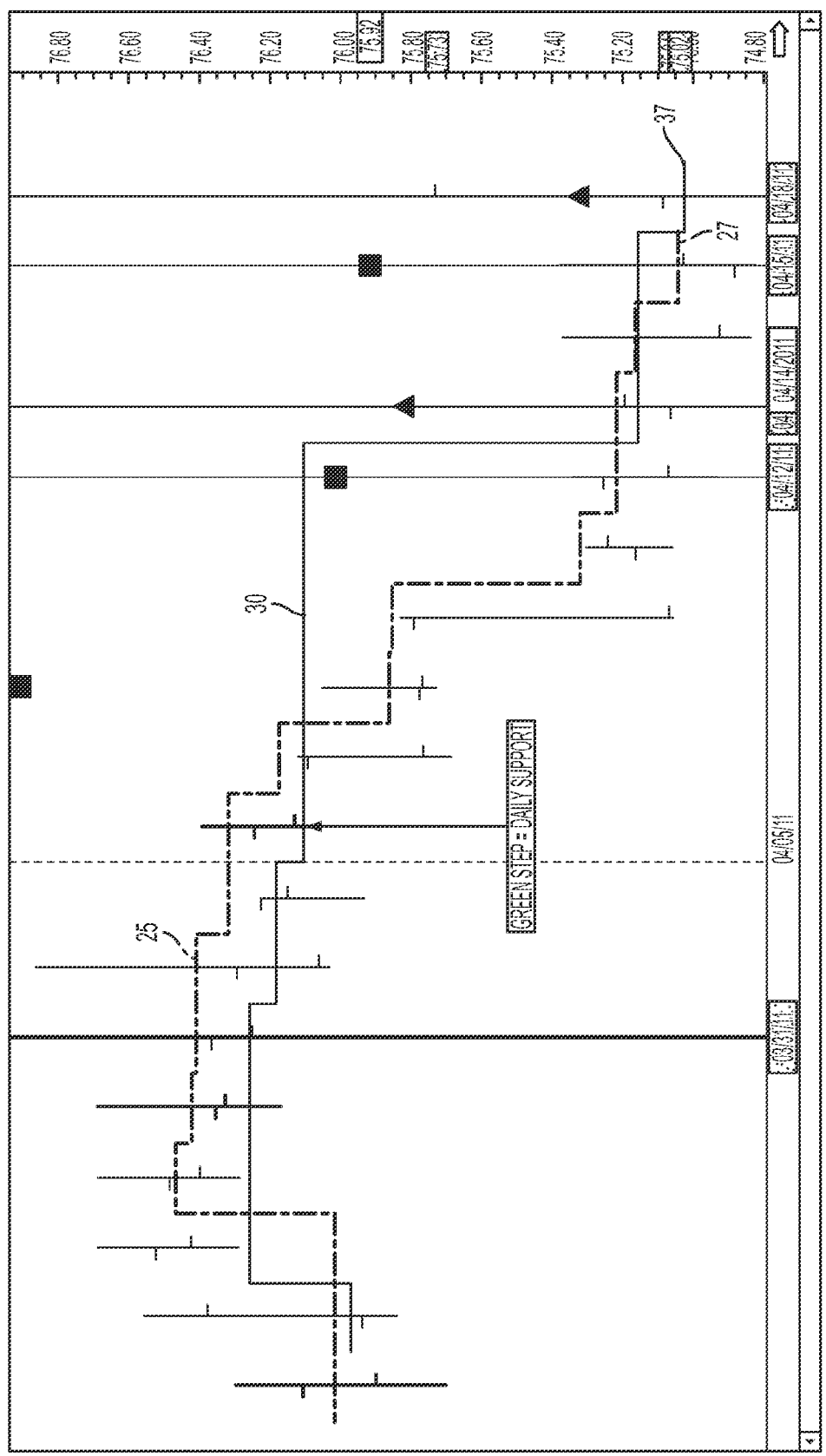
FIG. 5 is a computerized graphical plot of the price bars for a tradable financial instrument with a resistance line stalled and the support line continuing forward.

FIGS. 3, 4, and 5 show a daily price chart for the time period of Apr. 12, 2011 to Apr. 18, 2011, and the support and resistance lines switch positions back and forth to reflect the status of the average of critical prices (the high, low, and close prices for the tradable financial instrument). FIG. 3 shows this continuing plot of the daily price bars (10) for a tradable financial instrument as of Apr. 12, 2011 and Apr. 13, 2011. On Apr. 13, 2011, the average of the high (20), low (17), and closing (15) prices (i.e., the critical prices) has achieved a new high from the previously calculated resistance point that had dominated in the previous price bar of Apr. 12, 2011. The resistance line (25) stalls at end point (26) as of its Apr. 12, 2011, value, and the support line (30) has connected to a new support point (36) as of Apr. 13, 2011. The support line (30) has connected to end point (36) from its previously stalled position at support line end point (31) of FIG. 2. Moving to FIG. 4, one can see that the price of the tradable financial instrument moved in a way that the average of critical prices (high, low, and closing prices) reached a new low so that the resistance line (25) dominates the chart and continues out to end point (27) as of Apr. 15, 2011. The support line (30) stalled at end point (36) which was calculated as of Apr. 13, 2011. Continuing to FIG. 5, re-calculating the average of the critical prices and plotting the results shows that the resistance line stalls at end point (27) that was calculated as of Apr. 15, 2011, as the support line dominates the chart and continues to its new high at end point (37) calculated as of Apr. 18, 2011.

Figure 6:
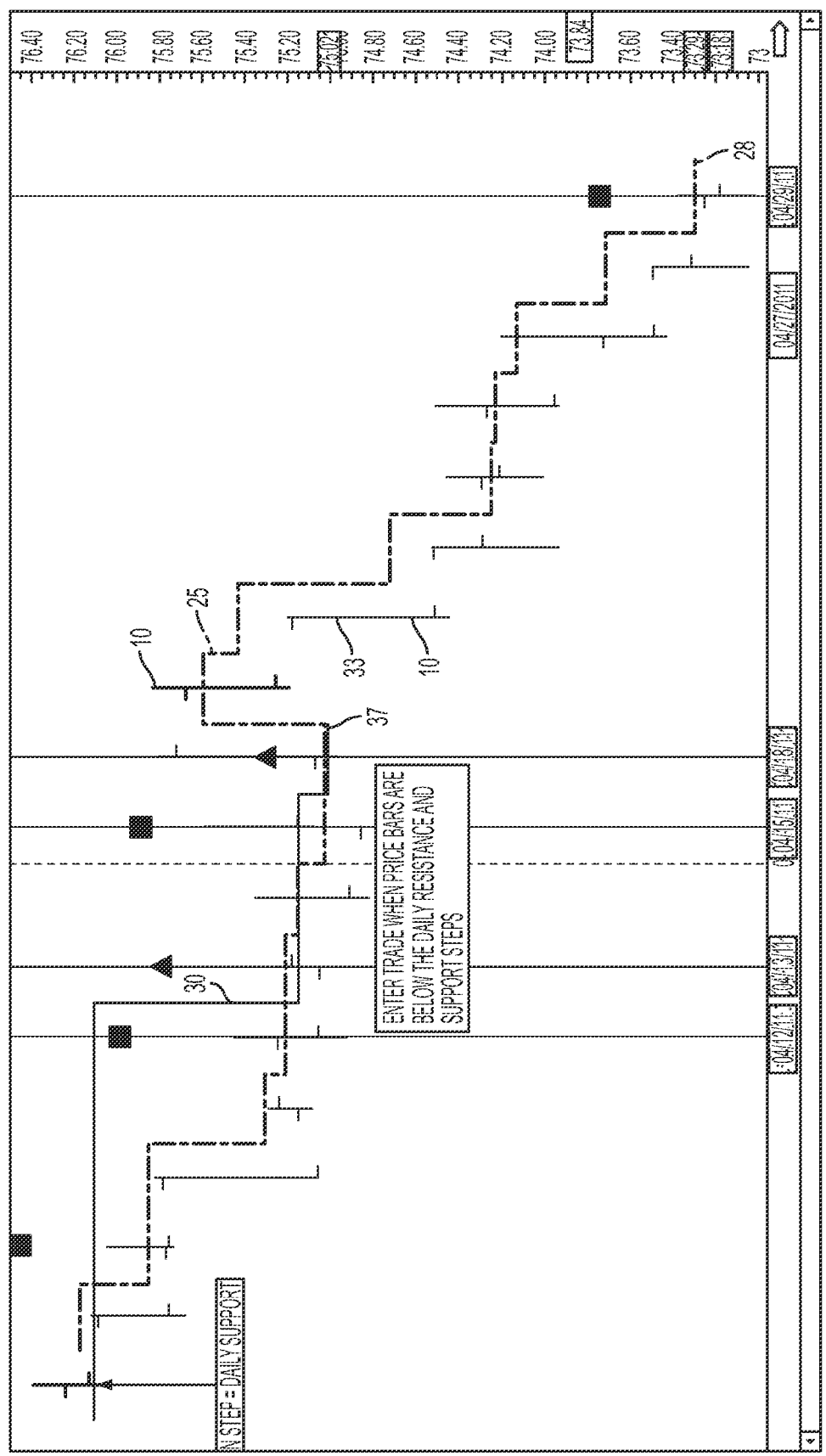
FIG. 6 is a computerized graphical plot of the price bars for a tradable financial instrument in which the support line has been previously stalled and the resistance line continues to plot new lower values for the averaged critical prices.

FIG. 6 continues the downward trend of a daily price of a tradable financial instrument and shows that the support line end point (37) from FIG. 5 remains stalled through at least Apr. 29, 2011. The resistance line continues to plot new lower values for the average of the critical prices (high, low, close) between Apr. 19, 2011, and Apr. 29, 2011. The price bar (10) reflects a price point (33) at which the algorithm of the system described herein would recommend entering a trade for on the tradable financial instrument because the price at price point (33) is below both the support line (30) and the resistance line (25). At that point, so far as daily support and resistance are concerned, the indicator of this invention suggests that the price of the instrument is going downward. A trader with a long position would sell the instrument to avoid further losses, and a trader seeking a short position would enter the trade to expect that the price will go down even farther. In this regard, price point (33) is considered a transition point for the tradable financial instrument price because the price at point (33) is below both support and resistance lines (25, 30).

Figure 7:
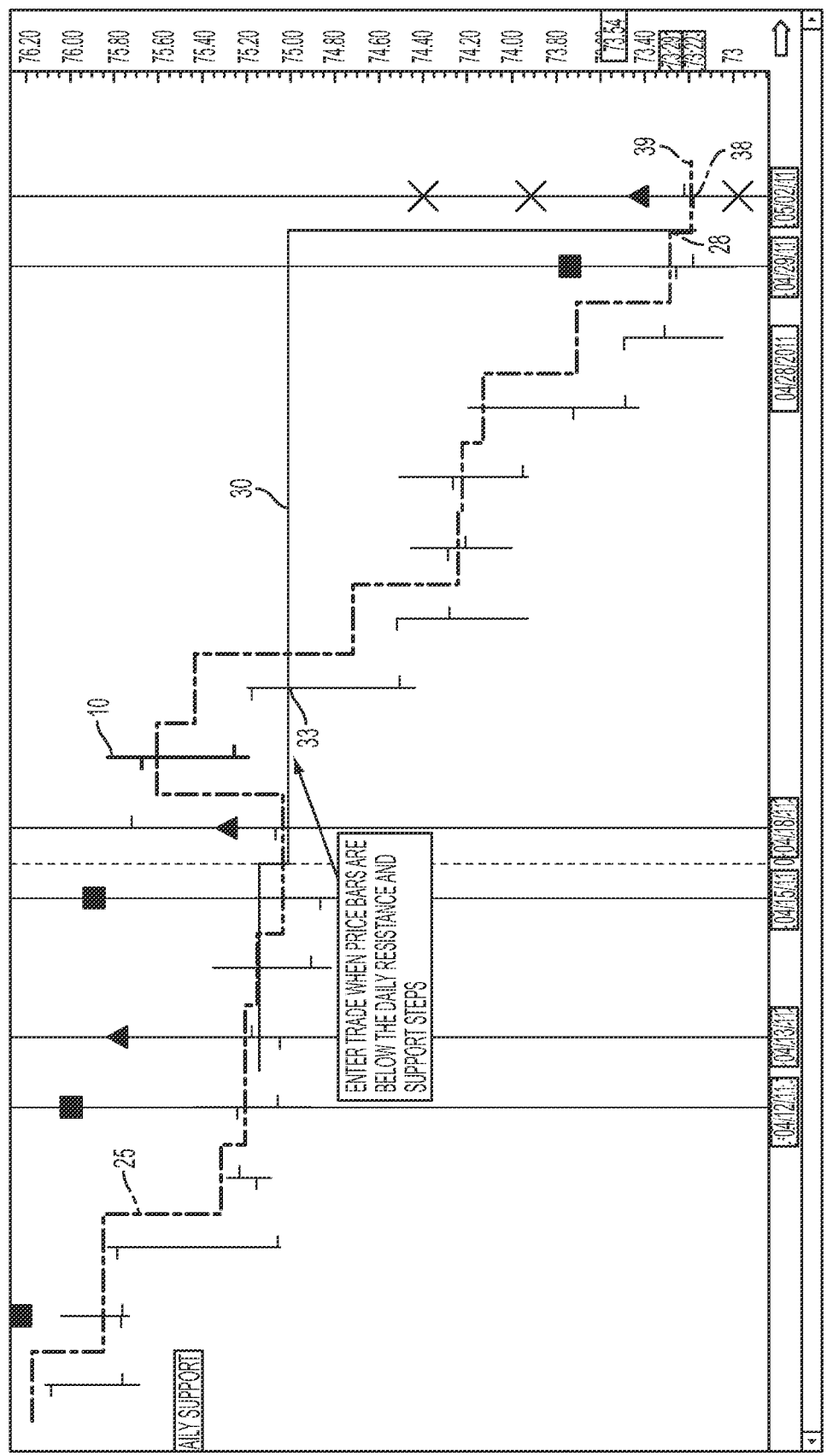
FIG. 7 is a computerized graphical plot of the price bars for a tradable financial instrument with a support line connecting to a most recently dated end point.

Continuing with FIG. 7, as of May 2, 2011, the tradable financial instrument continues to perform against resistance line (25) up to Apr. 29, 2011, where end point (28) stalls the resistance. As of May 2, 2011, the instrument shows support at price point (38), so support line 30 connects to price point (38) and continues to end point (39). The switch from resistance to support presents an opportunity according to the algorithm of this invention. When the price of the tradable financial instrument crosses the support line during the up-trend starting at price point (38), the algorithm used herein would recommend a change in ownership position of the tradable financial security (i.e. closing if in a short position and purchasing if a long position is desired). The visual indication of the resistance line (25) and the support line (30) allow a trader to determine when to make the ownership position change.

Figure 8:
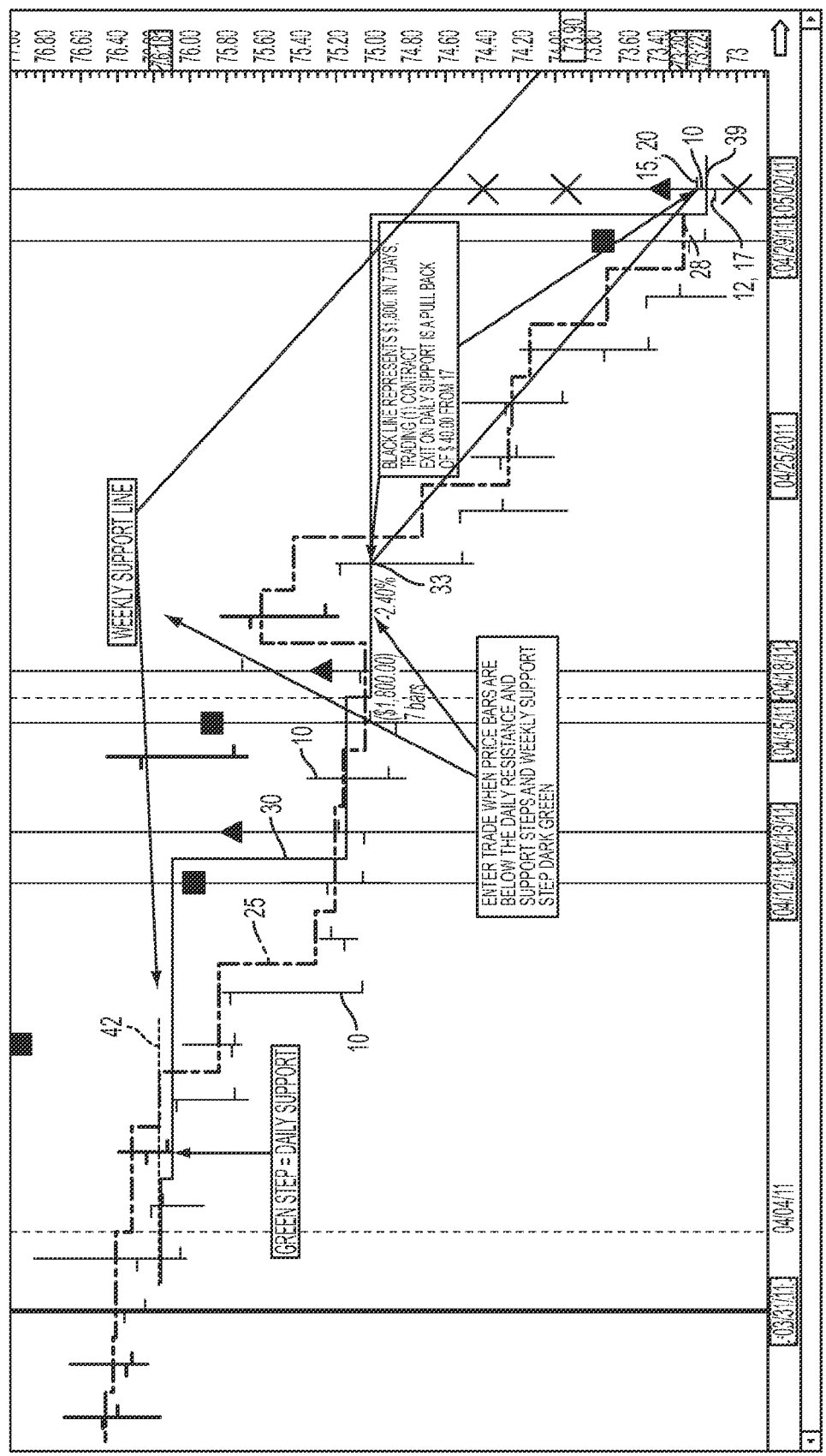
FIG. 8 is a computerized graphical plot of the price bars for a tradable financial instrument having daily support and resistance lines and weekly support and resistance lines on a common graph.

FIG. 8 adds another component to the indicator disclosed herein—that of an additional pair of support and resistance lines for a different time period. In the case of FIG. 8, the time periods shown are daily support and resistance (25, 30) and a weekly support line (42) with daily price bars (10). As a catch or safety net, some traders may prefer to confirm that a trend is truly changing in either an upward or downward direction by comparing the daily support and resistance positions with weekly, monthly, or quarterly support and resistance positions.

In general, the algorithm and indicator disclosed herein suggest entering a trade when the price of the tradable financial instrument "breaks" both support and resistance in one direction or the other. When the price is going up, the trader would either purchase to go to a long position or exit to close a short position. When the price is going down, the trader would sell to end a long position or enter a trade to begin a short position that banks on further declines in price. Entering a trade, therefore, is recommended by this algorithm upon price being compare to two lines—both support and resistance lines. Additional safety features can be relied upon by waiting to see if the current price clears support and resistance lines for more than one time period. In FIG. 8, the relevant time periods are daily and weekly lines.

FIG. 8 illustrates that while using only one shorter time period for comparing current price to support and resistance lines is riskier, the savings can be substantial as compared to waiting to see if a current price will clear support and resistance for additional time periods. In the example of FIG. 8, price point (33) has been identified as the point at which the price of the tradable financial instrument has dropped below the daily support and resistance lines (25, 30). Clearing both of those lines indicates that it is a good time to enter a trade for going short because the price is in a down trend. The next question is when to exit that short trade. In the example of FIG. 8, the price continues to drop to the resistance end point (28), and the instrument showed support for an uptrend (according to the daily support line) at price point (39). The absolute lowest price for that instrument in FIG. 8 is shown as lowest price (17), which happens to be the opening price (12) on May 2, 2011. Exiting the trade as soon as the current price rises above the support line (30) realized a price pull back of only $40 from the absolute low at price point (17). In other words, indicators of the prior art could not predict a closer exit point (39) that is closer to the absolute low (17) than that of the indicator disclosed herein.

Figure 9:
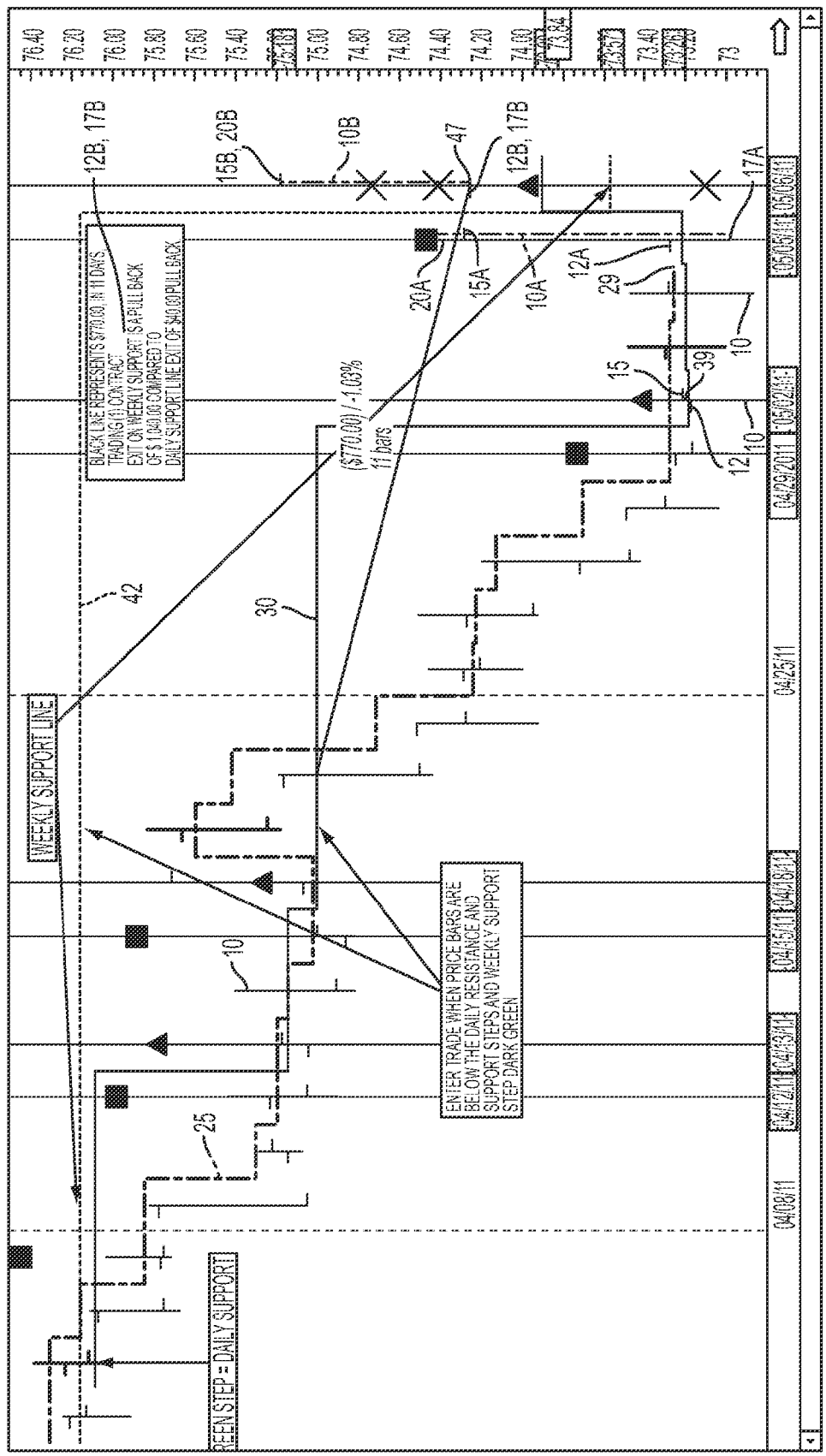
FIG. 9 is a computerized graphical plot of the price bars for a tradable financial instrument showing the price differential in trading on daily support and resistance as opposed to weekly support and resistance.

For comparison purposes, FIG. 9 shows what the result would be if the trader of FIG. 8 had waited until the current price rose back above the weekly support line (42), which would have occurred on May 6, 2011, at opening price (12B, 17B, 47). While that trade would assist in double checking that the daily support was accurate in indicating a price increase, by that point, the price of the instrument pulled back and the trader lost $1800 overall by waiting, which could have been avoided by trading as soon as the current price broke the daily support line at price point (39).

The indicator of this invention, therefore, uses support and resistance lines to assist the trader in determining when to change the ownership position of a tradable financial instrument. When the price of the instrument clears both lines, that is a time to enter the trade (upward direction is a time for purchasing long position, and a downward direction is a time for entering a short position). When the price clears the support line in an upward direction, that is, a short position exit point. When the price of the instrument clears the resistance line in the downward direction that would be a long position exit point. The indicator of this invention is capable of alerting the trader to these points and also capable of being programmed for automatic trades the instant the current price reaches a transition point.

Figure 10:
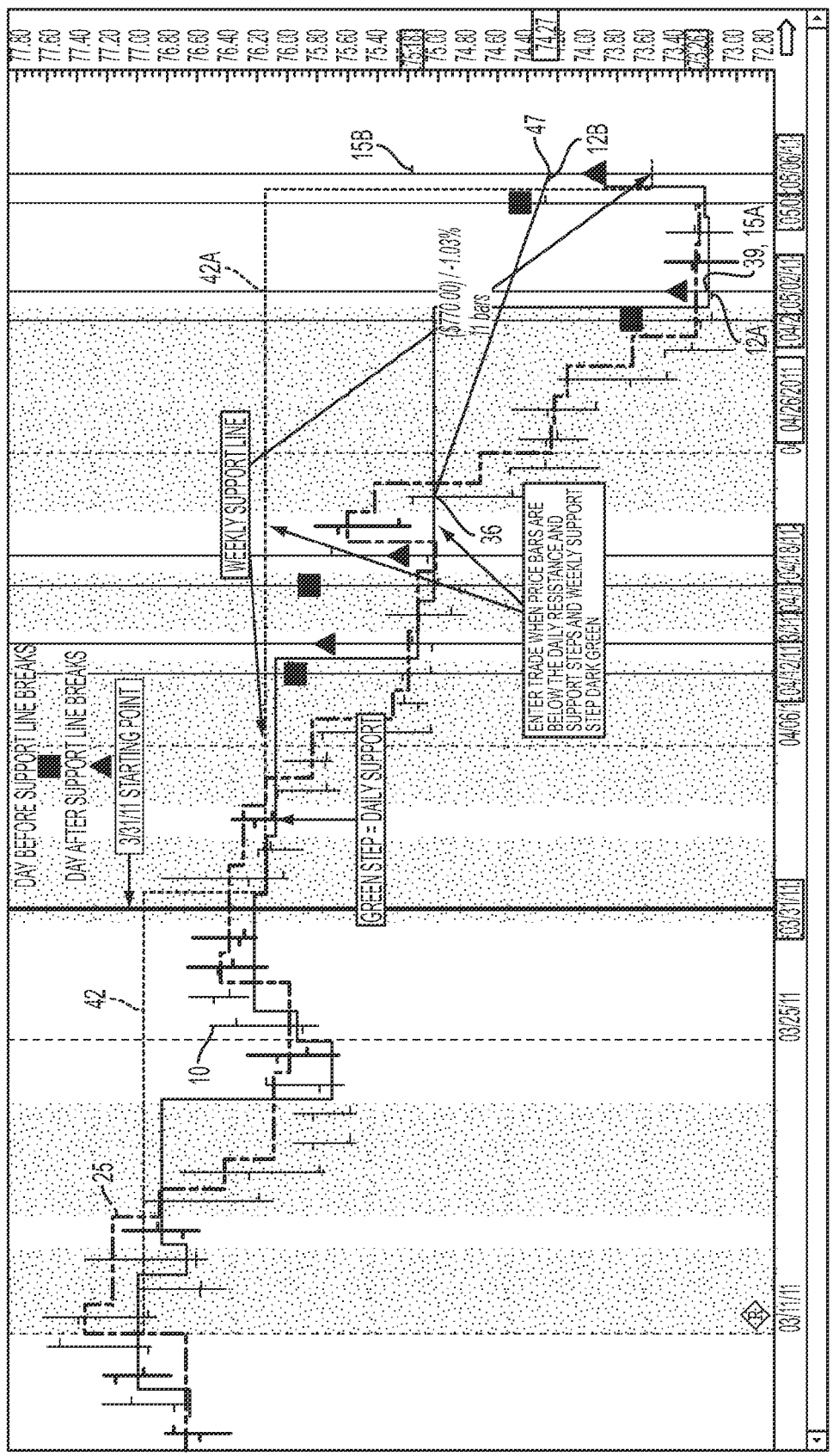
FIG. 10 is a computerized graphical plot of the price bars for a tradable financial instrument plotted against colored background zones alerting the trader to a current price comparison in relation to support and resistance lines.

FIG. 10 illustrates another aspect of the indicator that is plotted via a computer according to this invention. The chart may incorporate colored backgrounds to indicate zones to alert the trader in regard to the current price comparison to support and resistance lines. In the example of FIG. 10, when the current price is below the weekly support, weekly resistance, daily support, and daily resistance, the zone is colored red to show a potential downward trend. When the current price is fluctuating between selected support and resistance lines, the colored zone is white to alert the trader to the instability of the price. When the current price is above the weekly support, weekly resistance, daily support, and daily resistance, the zone is colored blue to show a potential upward trend. The indicator is programmable to change the color of the zones according to parameters that the trader prefers (i.e., by comparing the current price to any number of support and resistance lines for any number of time periods).

Figure 11:
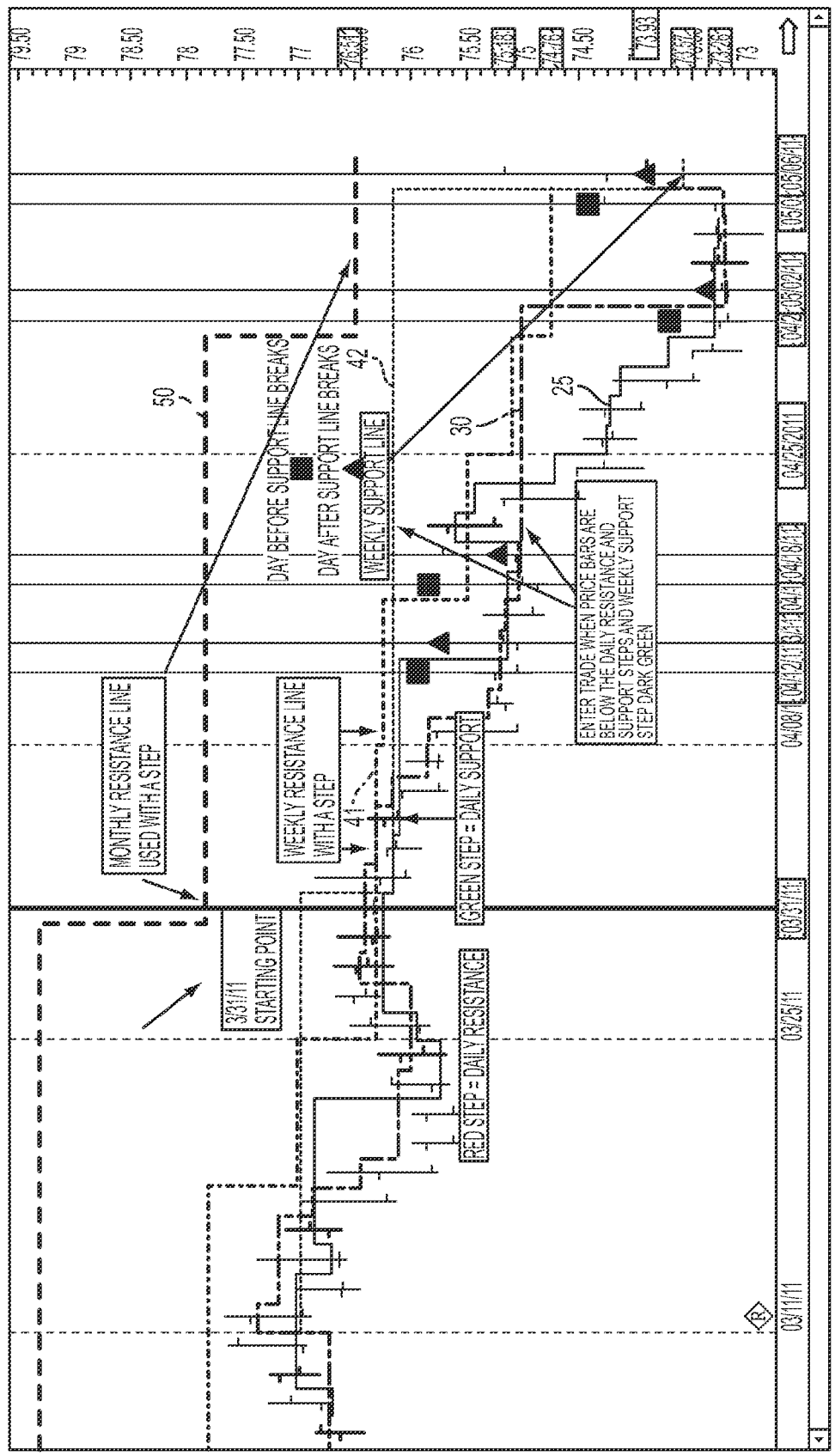
FIG. 11 is a computerized graphical plot of the price bars for a tradable financial instrument plotted along with a monthly resistance line superimposed over daily and weekly support and resistance lines.
Figure 12:
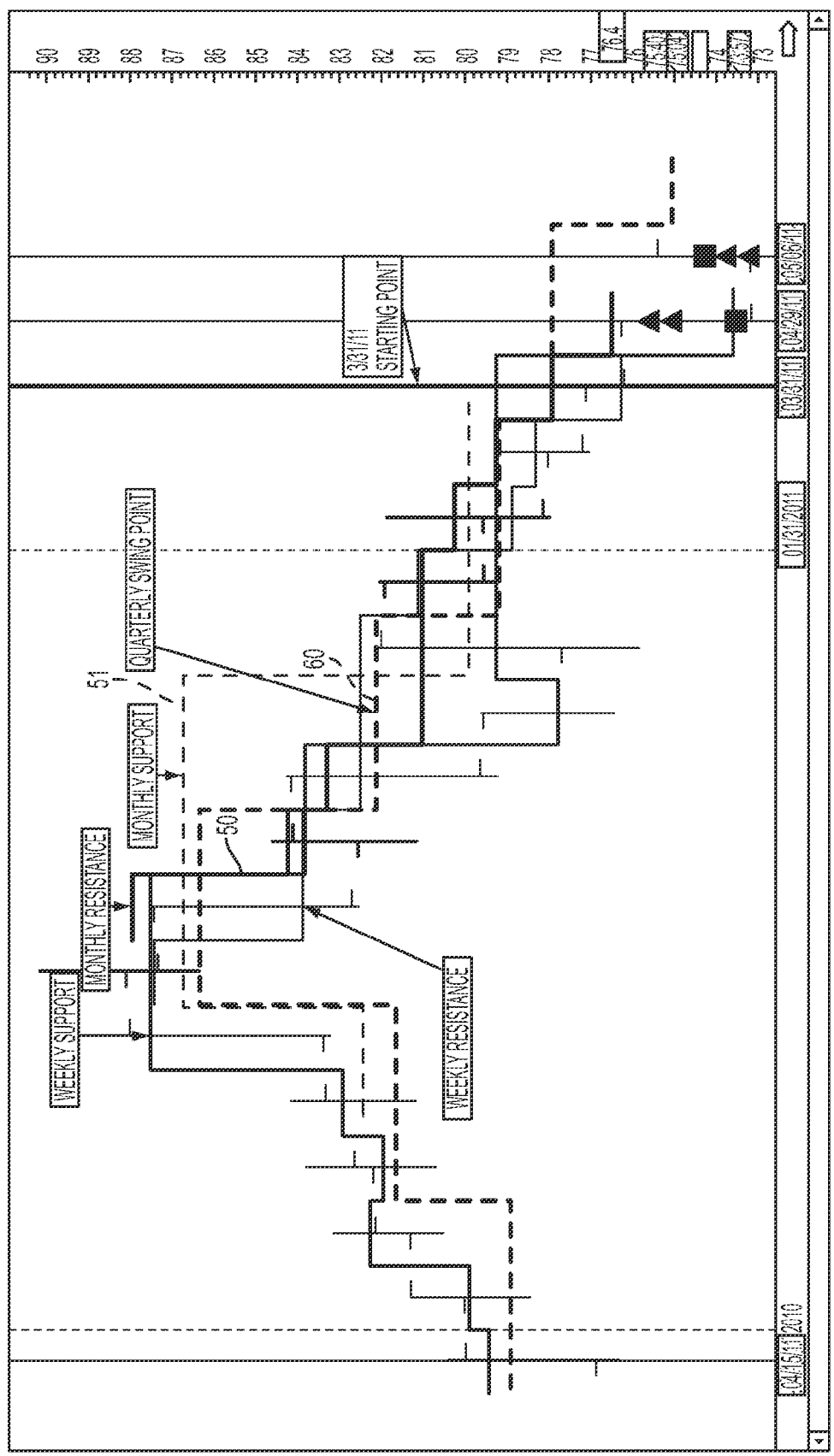
FIG. 12 is a computerized graphical plot of the price bars for a tradable financial instrument plotted along with a monthly support line and a quarterly support line.

FIGS. 11 and 12 show that additional support and resistance lines may be plotted on the same chart. FIG. 11 shows the monthly resistance line (50) superimposed over the weekly resistance line (41), the weekly support line (42), and the daily resistance line (25) and the daily support line (30). FIG. 12 adds the monthly support line (51) and the quarterly resistance line (60). The different support and resistance lines may be used as additional checks for a trader who would rather confirm that the current price has broken support and/or resistance for longer time periods.

Overall, the two line system of this invention, electronically plotted over different time periods, has established a more accurate indicator as set forth in the claims below.

The computerized system of this invention may be implemented on any computer that includes a non-transitory computer readable medium for the appropriate computer controlling commands that are programmed to implement the mathematical manipulations necessary to create the computerized plots of the figures. The computer readable medium may be part of a computer program product sold to individuals for installing on personal computers or a part of a mainframe or server based system, such as a web server.

The invention is set forth in more detail in the claims below.

The invention claimed is:

1. A computerized system for alerting a change in direction of the price of a tradable financial instrument at a critical point in time prior to the actual time at which the change occurs, the computerized system comprising:
   a computer for plotting:
   (i) a resistance line for the price of the tradable financial instrument, wherein resistance points on the resistance line are calculated sequentially as the lowest averaged values of a series of critical prices for a particular time period, wherein the critical prices comprise the highest price, the lowest price, and the closing price of the tradable instrument for that particular time period;
   (ii) a support line for the price of a tradable instrument, wherein support points on the support line are calculated sequentially as the highest averaged values of a series of critical prices for a particular time period, wherein the critical prices comprise the highest price, the lowest price, and the closing price of the tradable instrument for that particular time period;
   (iii) a transition point at which the price of the tradable instrument is predicted as being in either an upward trend or a downward trend;
   wherein said transition point is calculated as a price point at which the price of the tradable instrument is either higher or lower than both a corresponding resistance point on said resistance line and a corresponding support point on said support line.

2. A system according to claim 1, wherein said computer plots the range of prices for said time period as a bar.

3. A system according to claim 2, wherein said bar comprises tabs denoting an opening price and a closing price of said tradable instrument for said time period.

4. A system according to claim 3, wherein said bar comprises a first end point denoting the highest price during said time period and a second end point denoting the lowest price during said time period.

5. A system according to claim 4, wherein said resistance line, said support line, and said bars are plotted on a single chart.

6. A system according to claim 1, further comprising multiple pairs of support and resistance lines, wherein each respective pair of support and resistance lines comprises data calculated for a respective time period.

7. A system according to claim 6, wherein said respective time period is selected from the group consisting of a day, a week, a month, and a quarter of a calendar year.

8. A system according to claim 7, wherein said transition point is calculated as a price point at which the price of the tradable instrument is either higher or lower than more than one pair of said resistance lines and said support lines.

9. A system according to claim 8, wherein said transition point denotes an upward trend at a price point above said more than one pair of said support lines and said resistance lines.

10. A system according to claim 8, wherein said transition point denotes a downward trend at a price point below said more than one pair of said support lines and said resistance lines.

11. A system according to claim 8, wherein said transition point denotes a market entry point or a market exit point.

12. A system according to claim 1, wherein said support line comprises fewer calculated points than said resistance line across a time frame, wherein the average of said critical prices has not reached a new highest value across said time frame.

13. A system according to claim 1, wherein said resistance line comprises fewer calculated points than said support line across a time frame, wherein the average of said critical prices has not reached a new lowest value across said time frame.

14. A system according to claim 1, further comprising a graphically displayed background on which said resistance line, said support line, and said transition point is displayed.

15. A system according to claim 14, wherein said transition point denotes an upward trend at a price point above said support line and said resistance line, and said upward trend is plotted against said graphically displayed background in a first color band.

16. A system according to claim 14, wherein said transition point denotes a downward trend at a price point below said support line and said resistance line, and said downward trend is plotted against said graphically displayed background in a second color band.

17. A system according to claim 14, wherein said computer plots the range of prices for said time period as a bar, and said bar ranges in price values between said support line and said resistance line, and wherein said graphically displayed background is a third color band.

18. A system according to claim 1, wherein said transition point is a long position market entry point calculated as a price point at which the price of the tradable instrument is lower than both a corresponding resistance point on said resistance line and a corresponding support point on said support line.

19. A system according to claim 1, wherein said transition point is a short position market entry point calculated as a price point at which the price of the tradable instrument is higher than both a corresponding resistance point on said resistance line and a corresponding support point on said support line.

20. A computerized system for alerting a change in direction of the price of a tradable financial instrument at a critical point in time prior to the actual time at which the change occurs, the computerized system comprising:
  a computer for plotting:
  (i) a resistance line for the price of the tradable financial instrument, wherein resistance points on the resistance line are calculated sequentially as the lowest averaged values of a series of critical prices for a particular time period, wherein the critical prices comprise the highest price, the lowest price, and the closing price of the tradable instrument for that particular time period;
  (ii) a support line for the price of a tradable instrument, wherein support points on the support line are calculated sequentially as the highest averaged values of a series of critical prices for a particular time period, wherein the critical prices comprise the highest price, the lowest price, and the closing price of the tradable instrument for that particular time period;
  (iii) a transition point at which the price of the tradable instrument is predicted as being in an upward trend;
  wherein said transition point is a short position exit point calculated as a price of the tradable instrument that is higher than a corresponding support point on said support line.

21. A computerized system for alerting a change in direction of the price of a tradable financial instrument at a critical point in time prior to the actual time at which the change occurs, the computerized system comprising:
  a computer for plotting:
  (i) a resistance line for the price of the tradable financial instrument, wherein resistance points on the resistance line are calculated sequentially as the lowest averaged values of a series of critical prices for a particular time period, wherein the critical prices comprise the highest price, the lowest price, and the closing price of the tradable instrument for that particular time period;
  (ii) a support line for the price of a tradable instrument, wherein support points on the support line are calculated sequentially as the highest averaged values of a series of critical prices for a particular time period, wherein the critical prices comprise the highest price, the lowest price, and the closing price of the tradable instrument for that particular time period;
  (iii) a transition point at which the price of the tradable instrument is predicted as being in an upward trend;
  wherein said transition point is a long position exit point calculated as a price of the tradable instrument that is lower than a corresponding resistance point on said resistance line.

22. A system of identifying a point in time at which the price of a tradable financial instrument is identified as trending upward or downward, the system comprising:
  a computer for calculating support lines and resistance lines on a graphically represented plot of price trends for the tradable financial instrument, wherein:
  (i) a resistance line for the price of the tradable financial instrument, wherein resistance points on the resistance line are calculated sequentially as the lowest averaged values of a series of critical prices for a particular time period, wherein the critical prices comprise the highest price, the lowest price, and the closing price of the tradable instrument for that particular time period;
  (ii) a support line for the price of a tradable instrument, wherein support points on the support line are calculated sequentially as the highest averaged values of a series of critical prices for a particular time period, wherein the critical prices comprise the highest price, the lowest price, and the closing price of the tradable instrument for that particular time period; and
  (iii) a trade point at which the price of the tradable instrument is predicted as being in either an upward trend or a downward trend;
  and
  wherein said system comprises a market entry alert when said trade point is calculated as a price at which the price of the tradable instrument is higher than both said resistance line and said support line.

23. A system according to claim 22, further comprising a short position exit alert when said trade point is calculated as a price at which the price of the tradable instrument is higher than said support line.

24. A system according to claim 22, further comprising a long position exit alert when said trade point is calculated as a price at which the price of the tradable instrument is lower that said support line.

25. A system according to claim 22 wherein said graphically represented plots of price trends further comprise bars representing a range of prices at which said tradable financial instrument trades for a particular time period, wherein said bars comprise tabs for graphically representing an opening price and a closing price for the tradable financial instrument for said particular time period.

26. A system according to claim 22, wherein for said particular time period, said computer records the price at which said tradable financial security traded on the previous day with the lowest average of critical prices, said critical prices comprising the highest price, the lowest price, and the closing price of the tradable financial security for said particular time period.

27. A system according to claim 26, wherein, said graphically represented plots further comprise colored bands having a first band color for price bars with a current price that is lower than said lowest average of critical prices.

28. A system according to claim 22, wherein for said particular time period, said computer records the price at which said tradable financial security traded on the previous day with the highest average of critical prices, said critical prices comprising the highest price, the lowest price, and the closing price of the tradable financial security for said particular time period.

29. A system according to claim 28, wherein, said graphically represented plots further comprise colored bands having a second band color for price bars with a current price that is higher than said highest average of critical prices.

30. A system according to claim 22, wherein said graphically represented plots further comprise colored bands having a third color for price bars with a current price that is between said support line and said resistance line.

31. A system according to claim 22, further comprising multiple pairs of support and resistance lines, wherein each respective pair of support and resistance lines comprises data calculated for a respective time period.

32. A system according to claim 31, wherein said respective time period is selected from the group consisting of a day, a week, a month, and a quarter of a calendar year.

33. A system according to claim 31, wherein said trade point is calculated as a point at which the price of said tradable financial instrument is either above or below more than one pair of said respective pairs of support and resistance lines.

* * * * *